US012767783B2

(12) United States Patent
Kao

(10) Patent No.: US 12,767,783 B2
(45) Date of Patent: Oct. 20, 2026

(54) METHOD FOR DEGRADING POLYURETHANE ACRYLIC RESIN MATERIAL

(71) Applicant: Swancor Innovation & Incubation Co., Ltd., Nantou City (TW)

(72) Inventor: Jun-Qi Kao, Nantou City (TW)

(73) Assignee: Swancor Innovation & Incubation Co., Ltd., Nantou City (TW)

( * ) Notice: Subject to any disclaimer, the term of this patent is extended or adjusted under 35 U.S.C. 154(b) by 355 days.

(21) Appl. No.: 18/396,898

(22) Filed: Dec. 27, 2023

(65) Prior Publication Data

US 2024/0239987 A1 Jul. 18, 2024

(30) Foreign Application Priority Data

Dec. 30, 2022 (TW) .................................. 111150872

(51) Int. Cl.
*C08J 11/28* (2006.01)
*C08G 18/67* (2006.01)
*C08L 75/16* (2006.01)

(52) U.S. Cl.
CPC ............. *C08J 11/28* (2013.01); *C08G 18/672* (2013.01); *C08L 75/16* (2013.01); *C08L 2205/16* (2013.01); *C08L 2312/00* (2013.01)

(58) Field of Classification Search
USPC ........................................................... 521/42
See application file for complete search history.

(56) References Cited

U.S. PATENT DOCUMENTS

| | | | |
|---|---|---|---|
| 6,350,826 | B1 | 2/2002 | Herold |
| 2009/0012202 | A1 | 1/2009 | Jacobine et al. |
| 2016/0251472 | A1 | 9/2016 | Spyrou et al. |
| 2020/0140593 | A1 | 5/2020 | Nickerl et al. |

FOREIGN PATENT DOCUMENTS

| | | | |
|---|---|---|---|
| CA | 3121839 | A1 | 6/2020 |
| CN | 103030767 | A | 4/2013 |
| CN | 104694064 | A | 6/2015 |
| CN | 104694064 | B | 9/2016 |
| CN | 107384242 | A | 11/2017 |
| CN | 107849206 | A | 3/2018 |
| CN | 108473761 | A | 8/2018 |
| CN | 109486066 | A | 3/2019 |
| CN | 109503808 | A | 3/2019 |
| CN | 110831997 | A | 2/2020 |
| CN | 112409565 | A | 2/2021 |
| CN | 113583198 | A | 11/2021 |
| EP | 2183311 | B1 | 12/2014 |
| JP | H06107983 | A | 4/1994 |
| JP | H06192362 | A | 7/1994 |
| JP | 2008291105 | A | 12/2008 |
| JP | 2013245268 | A | 12/2013 |
| WO | 2012076686 | A2 | 6/2012 |

OTHER PUBLICATIONS

Lorena E. Sánchez-Cadena, et al.,Solvolysis of acrylate-urethane coatings cured by electron-beam and UV radiation; Progress in Organic Coatings, vol. 136, Nov. 2019 (Year: 2019).*
EP-2183311-B1 Machine Translation (Year: 2014).*
Sánchez-Cadena Lorena E et al., "Solvolysis of acrylate-urethane coatings cured by electron-beam and UV radiation", Process in Organic Coatings, Elsevier BV, NL, vol. 136, Aug. 22, 2019, pp. 1-6.

* cited by examiner

*Primary Examiner* — Terressa Boykin
(74) *Attorney, Agent, or Firm* — McBee Moore & Vanik IP, LLC

(57) ABSTRACT

A method for degrading a polyurethane acrylic resin material includes steps as follows. The polyurethane acrylic resin material is provided, wherein the polyurethane acrylic resin material is obtained by curing a polyurethane acrylic resin. A degradation solution is provided, wherein the degradation solution at least includes a degradation compound, and the degradation compound at least includes a reactive NH or $NH_2$ group and a reactive OH group. A mixing step is performed, wherein the polyurethane acrylic resin material is mixed with the degradation solution to form a degradation mixture. A heating step is performed, wherein the degradation mixture is heated to a degradation temperature and maintained a degradation time to degrade the polyurethane acrylic resin material.

20 Claims, 3 Drawing Sheets

METHOD FOR DEGRADING POLYURETHANE ACRYLIC RESIN MATERIAL

RELATED APPLICATIONS

This application claims priority to Taiwan Application Serial Number 111150872, filed Dec. 30, 2022, which is herein incorporated by reference.

BACKGROUND

Technical Field

The present disclosure relates to a method for degrading a polyurethane material. More particularly, the present disclosure relates to a method for degrading a network-containing cross-linked polyurethane acrylic resin material, a polyurethane acrylic resin, a composition, a preparation method and a composite material thereof.

Description of Related Art

Polyurethane acrylic resin has a wide design space and can be adjusted in rigidly or flexibly according to the requirement. The advantages of the molecular structure of the polyurethane acrylic resin include good corrosion resistance, good wear resistance, good adhesion, good heat resistance, good mechanical property, good wetting property for a variety of fibers, etc., and are suitable for the structure design of the composite material. However, due to the abovementioned excellent characteristics, it is difficult to decompose and recycle this type of the composite material, which will eventually lead to problems such as lack of landfills and environmental pollution. Therefore, the decomposition and recycling of the waste composite material have become the important issues.

Polyurethane acrylic resin composite material is difficult to recycle by melting or dissolving because the polyurethane acrylic resin therein is in a three-dimensional network crosslinked state. According to the existing technology, polyurethane acrylic resin composite material only can be recycled by the method of huge consumption of energy or time and high cost, such as burying and incineration, there is a lack of degradable recycling technology. However, the two treatment methods of burying and incineration are gradually becoming unfeasible in the future. The degradable resin should be developed to fulfill the recycling the composite material to achieve the purpose of waste reduction.

Therefore, how to find an appropriate degradation solution to degrade the polyurethane acrylic resin and then achieve the purpose of recycling, which is the goal of the relevant industry.

SUMMARY

According to one aspect of the present disclosure, a method for degrading a polyurethane acrylic resin material includes steps as follows. The polyurethane acrylic resin material is provided, wherein the polyurethane acrylic resin material is obtained by curing a polyurethane acrylic resin. A degradation solution is provided, wherein the degradation solution at least includes a degradation compound, and the degradation compound at least includes a reactive NH or $NH_2$ group and a reactive OH group. A mixing step is performed, wherein the polyurethane acrylic resin material is mixed with the degradation solution to form a degradation mixture. A heating step is performed, wherein the degradation mixture is heated to a degradation temperature and maintained a degradation time to degrade the polyurethane acrylic resin material.

BRIEF DESCRIPTION OF THE DRAWINGS

The present disclosure can be more fully understood by reading the following detailed description of the embodiment, with reference made to the accompanying drawings as follows.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

<Method for Degrading Polyurethane Acrylic Resin Material>

Figure 1:
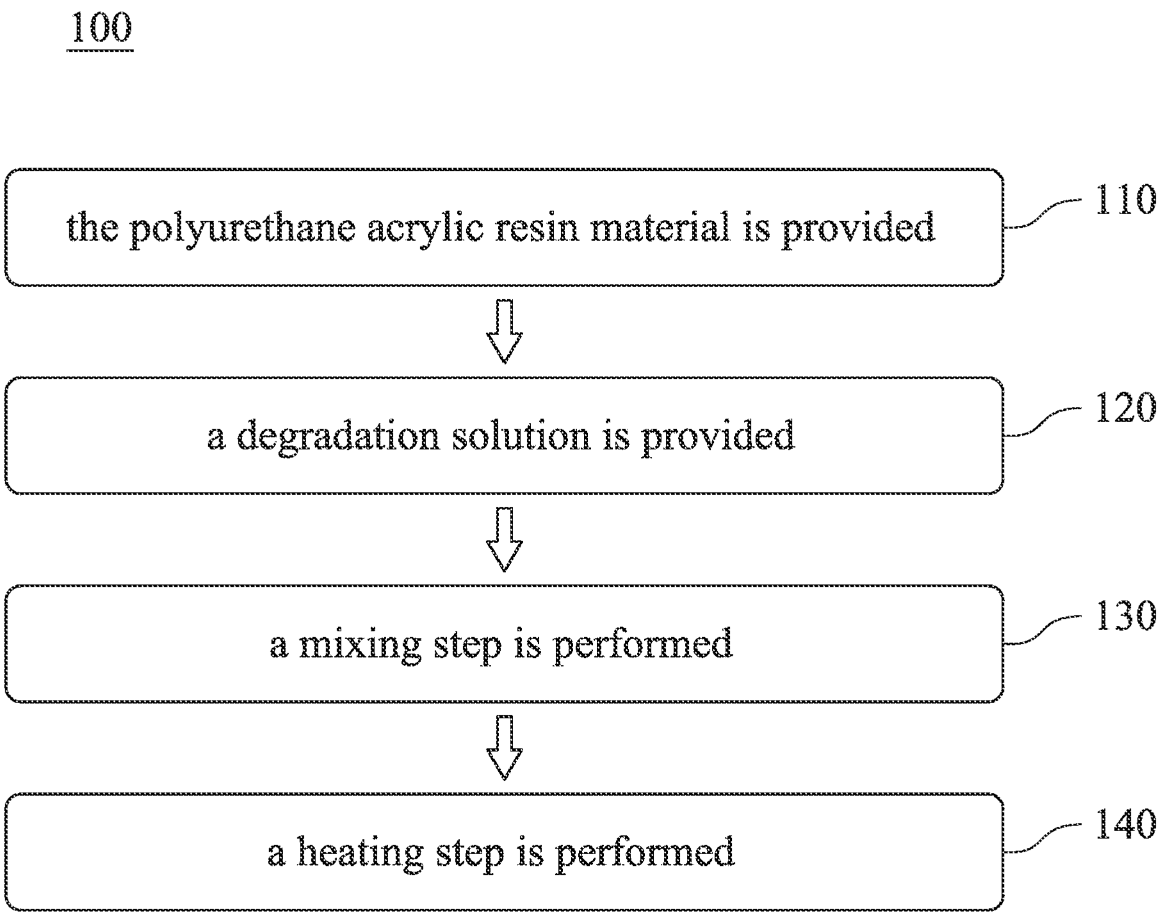
FIG. 1 is a flow chart of a method for degrading a polyurethane acrylic resin material according to one embodiment of the present disclosure.

Reference is made to FIG. 1, which is a flow chart of a method for degrading a polyurethane acrylic resin material 100 according to one embodiment of the present disclosure. In FIG. 1, the method for degrading the polyurethane acrylic resin material 100 includes a step 110, a step 120, a step 130 and a step 140.

In the step 110, the polyurethane acrylic resin material is provided, which is obtained by curing a polyurethane acrylic resin. In detail, the polyurethane acrylic resin material of the present disclosure can be a cured polyurethane acrylic resin or a composite material containing cured polyurethane acrylic resin. The cured polyurethane acrylic resin can be cured at the room temperature or the high temperature by adding the conventional accelerator and the free radical initiator to form a network cross-linked cured product. Furthermore, the composite material containing cured polyurethane acrylic resin is obtained by impregnating the polyurethane acrylic resin and a fiber at the room temperature or the high temperature, and the fiber can be a glass fiber, a carbon fiber, a polyamide fiber or a mixture thereof, but it is not limited thereto.

In the step 120, a degradation solution is provided, which at least includes a degradation compound, and the degradation compound at least includes a reactive NH or $NH_2$ group and a reaction OH group. Specifically, the reactive NH or $NH_2$ group and the reactive OH group are the functional groups that can react with the polyurethane acrylic resin and can be performed the ammonolysis and alcoholysis without causing the damage to the fiber in the composite material. In detail, the degradation compound can have a structure represented by formula (i):

$$NH_m\text{-}(X\text{—}OH)_n \quad \text{formula (i),}$$

wherein X is an alkyl group or an oxyalkyl group, m is 1 or 2 and m+n=3. The degradation compound can still be sufficiently reactive to the polyurethane acrylic resin without adding the catalyst to achieve the purpose of high-efficiency degradation.

In the step 130, a mixing step is performed, wherein the polyurethane acrylic resin material is mixed with the degradation solution to form a degradation mixture.

In the step 140, a heating step is performed, wherein the degradation mixture is heated to a degradation temperature and maintained a degradation time to degrade the polyurethane acrylic resin material, wherein the degradation temperature can be from 135° C. to a boiling point temperature of the degradation solution, and the degradation time can be 2 hours to 24 hours.

Therefore, in the present disclosure, the polyurethane acrylic resin material containing network cross-linking is reacted with the degradation solution at least containing a reactive NH or $NH_2$ group and a reactive OH group by ammonolysis and alcoholysis, and the temperature is raised to achieve the high-efficiency degradation effect. The highest degradation temperature can be performed at the boiling point temperature of the degradation solution, and the excess degradation solution can be used as the solvent during the degradation process with the purpose of diluting and suspending the fiber. After the degradation, the volatile substance can be separated by the reduced pressure distillation method, and the volatile substance is the degradation solution containing the reactive NH or $NH_2$ group and the reactive OH group, and can be reused. Furthermore, after degrading the composite material containing cured polyurethane acrylic resin, the polyurethane acrylic resin can be decomposed and removed to form the recycled fiber without plastic adhesion, which can realize the recycling mechanism for separating the fiber and the organic substance.

According to the method for degrading the polyurethane acrylic resin material 100 of the present disclosure, more than 40% of a total weight of the polyurethane acrylic resin is an oligomer, which has a structure represented by formula (I):

late compound is added to the second mixture and maintained at the first temperature to react to obtain the polyurethane acrylic resin.

The aforementioned isocyanate compound can be a bifunctional isocyanate compound or a polyfunctional isocyanate compound. The bifunctional isocyanate compound or the polyfunctional isocyanate compound can be an aromatic ring isocyanate, and the aromatic ring isocyanate can be a toluene diisocyanate, a poly(methylene phenyl isocyanate), a diphenylmethane diisocyanate or a mixture thereof. In detail, the aforementioned isocyanate compound can be but not limited to one or more of MR200 (purchased from TOSOH), PM200 (purchased from WANHUA), M20S (purchased from BASF), 44V20 (purchased from covestro AG), 5005 (purchased from HUNTSMAN), NM (purchased from TOSOH), MDI-50 (purchased from WANHUA).

The aforementioned inhibitor is commonly known that added to ensure the storage (stability) of the resin in general free radical curing system resin, and the suitable inhibitor can be selected from the known inhibitor to add according to the requirement, and will not be described herein.

The aforementioned catalyst can be an organic tin, an organic bismuth or an organic zinc, and an added amount of the catalyst can be 50 ppm to 200 ppm of a total content of the polyurethane acrylic resin.

The aforementioned diluting monomer is a free radical curable diluting monomer, which can be a (methyl)methacrylate, a (methyl)ethyl acrylate, a (methyl)hydroxyethyl acrylate, a (methyl)hydroxypropyl acrylate, a (methyl) isobornyl acrylate, a (methyl)cyclohexyl acrylate, a (methyl) tetrahydrofurfuryl acrylate, a styrene, a methyl styrene, a vinyl toluene or a mixture thereof, and the first temperature can be 40° C. to 80° C., preferably can be 50° C. to 70° C.

The aforementioned polyol compound can be a bifunctional polyol compound or a polyfunctional polyol compound, which can be a polyoxyethylene ether, a polyoxypropylene ether, a polytetrahydrofuran or a mixture thereof, and a number average molecular weight of the polyol formula (I)

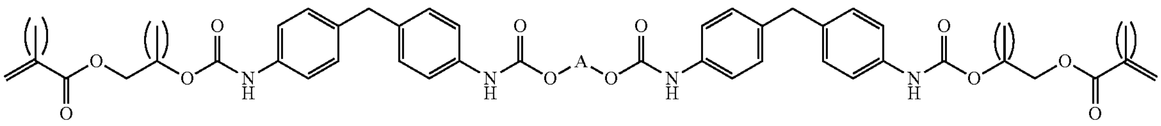

, wherein A is a polyethoxy group, a polypropoxy group or a polytetrahydrofuran group.

Figure 2:
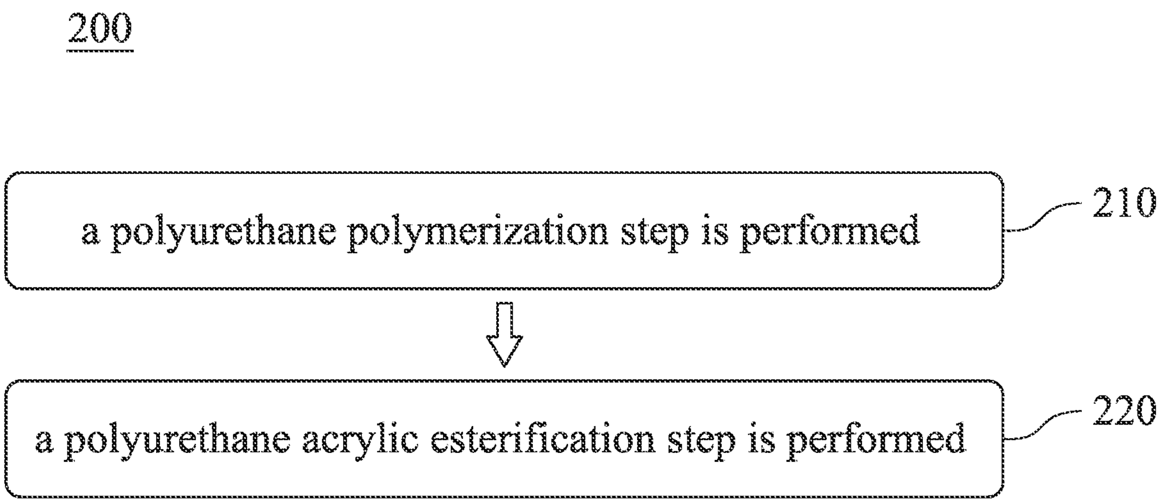
FIG. 2 is a flow chart of a method for preparing a polyurethane acrylic resin according to another embodiment of the present disclosure.

According to the method for degrading the polyurethane acrylic resin material 100 of the present disclosure, a preparation of the polyurethane acrylic resin can be referred to FIG. 2, wherein FIG. 2 is a flow chart of a method for preparing a polyurethane acrylic resin 200 according to another embodiment of the present disclosure. In FIG. 2, the method for preparing the polyurethane acrylic resin 200 includes a step 210 and a step 220.

In the step 210, a polyurethane polymerization step is performed, wherein an isocyanate compound, an inhibitor and a catalyst are mixed in a diluting monomer, and heated to a first temperature to obtain a first mixture, then a polyol compound is added to the first mixture and maintained at the first temperature to react to obtain a second mixture.

In the step 220, a polyurethane acrylic esterification step is performed, wherein a hydroxyl-containing (methyl)acrycompound is less than 2000. If the number average molecular weight of the polyol compound is greater than 2000, it will be difficult to achieve the requirement of high rigidity composite material.

The aforementioned hydroxyl-containing (methyl)acrylate compound can be a hydroxyethyl methacrylate (2-HEMA), a hydroxyethyl acrylate (2-HEA), a hydroxypropyl methacrylate (2-HPMA), a hydroxypropyl acrylate (2-HPA) or a mixture thereof.

The equivalent ratio of a NCO group of the aforementioned isocyanate compound to an OH group of the aforementioned polyol compound can be 1.5:1 to 10:1. When the ratio of NCO group/OH group is lower than 1.5, the polymerization molecular weight will be high and the rigidity will be insufficient. When the ratio of NCO group/OH group is higher than 10, the rigidity after curing will be too high and the degradation efficiency will be poor. Furthermore, the NCO group of the isocyanate compound will be remained in the step 210, so that the hydroxyl-containing (methyl)acrylate compound in the step 220 can react with the isocyanate compound. Therefore, the equivalent ratio of the OH group of the hydroxyl-containing (methyl)acrylate compound to the NCO group of the isocyanate compound remaining after the polyurethane polymerization step can be 1:1 to 1.05:1.

The aforementioned polyurethane acrylic resin includes the oligomer represented by formula (I), the definition of the oligomer can refer to the aforementioned paragraph, and will not be described herein. In detail, the composition of the aforementioned polyurethane acrylic resin includes the isocyanate compound, the polyol compound, the hydroxyl-containing (methyl)acrylate compound and the diluting monomer, and the aforementioned oligomer is synthesized by the isocyanate compound, the polyol compound, and the hydroxyl-containing (methyl)acrylate compound.

Figure 3:
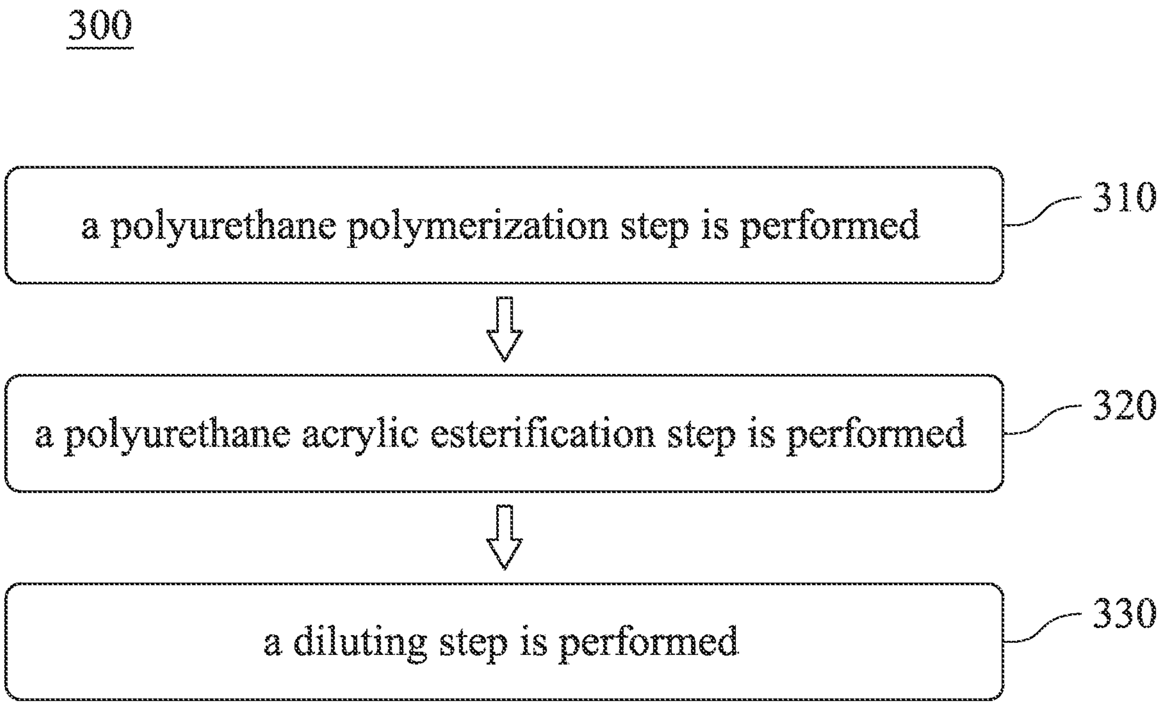
FIG. 3 is a flow chart of a method for preparing a polyurethane acrylic resin according to further another embodiment of the present disclosure.

According to the method for degrading the polyurethane acrylic resin material 100 of the present disclosure, the preparation of the polyurethane acrylic resin also can be referred to FIG. 3, wherein FIG. 3 is a flow chart of a method for preparing a polyurethane acrylic resin 300 according to further another embodiment of the present disclosure. In FIG. 3, the method for preparing the polyurethane acrylic resin 300 includes a step 310, a step 320 and a step 330.

The details of the step 310 and the step 320 can refer to the step 210 and step 220, and will not be described herein. Specifically, in the step 330, a diluting step is performed, wherein after the second mixture added with the hydroxyl-containing (methyl)acrylate compound reacting at the first temperature (that is a third mixture), the third mixture is cooled and the diluting monomer is added to obtain the polyurethane acrylic resin. Specifically, the step 330 involves the adjustment of operating viscosity, wherein the optimal viscosity of the vacuum infusion resin is 100 cps to 250 cps, while the optimal viscosity of the hand lay-up resin is 300 cps to 450 cps. In the step 330, the appropriate amount of the diluting monomer is added to control the viscosity of the polyurethane acrylic resin, thus, the polyurethane acrylic resin that is more suitable for operation can be obtained to facilitate the subsequent application of the polyurethane acrylic resin material. The aforementioned application refers to the product that is manufactured by using the process such as hand lay-up molding, compression molding, prepreg molding, pultrusion molding, fiber winding, resin transfer molding and vacuum infusion molding. The definition of the diluting monomer can refer to the aforementioned paragraph, and will not be described herein.

Furthermore, the diluting step in the method for preparing the polyurethane acrylic resin 300 of the present disclosure is determined by the viscosity requirement of the operating process, and in the method for preparing the polyurethane acrylic resin 200 of the present disclosure, the polyurethane acrylic resin of the present disclosure can be obtained after the polyurethane acrylic esterification step.

Therefore, the polyurethane acrylic resin of the present disclosure uses the isocyanate with more than bifunctional group and the polyol to perform the polyurethane chain extension reaction, so as to perform the end-capping with the hydroxyl-containing acrylate compound. Then, diluting with the free radical curable diluting monomer according to the operating viscosity to obtain the degradable polyurethane acrylic resin.

Specifically, the reaction schematic equation of the method for preparing the polyurethane acrylic resin of the present disclosure is shown in Table 1, wherein M is the diluting monomer, which will form the network copolymerization structure with the polyurethane acrylic resin after free radical curing.

TABLE 1

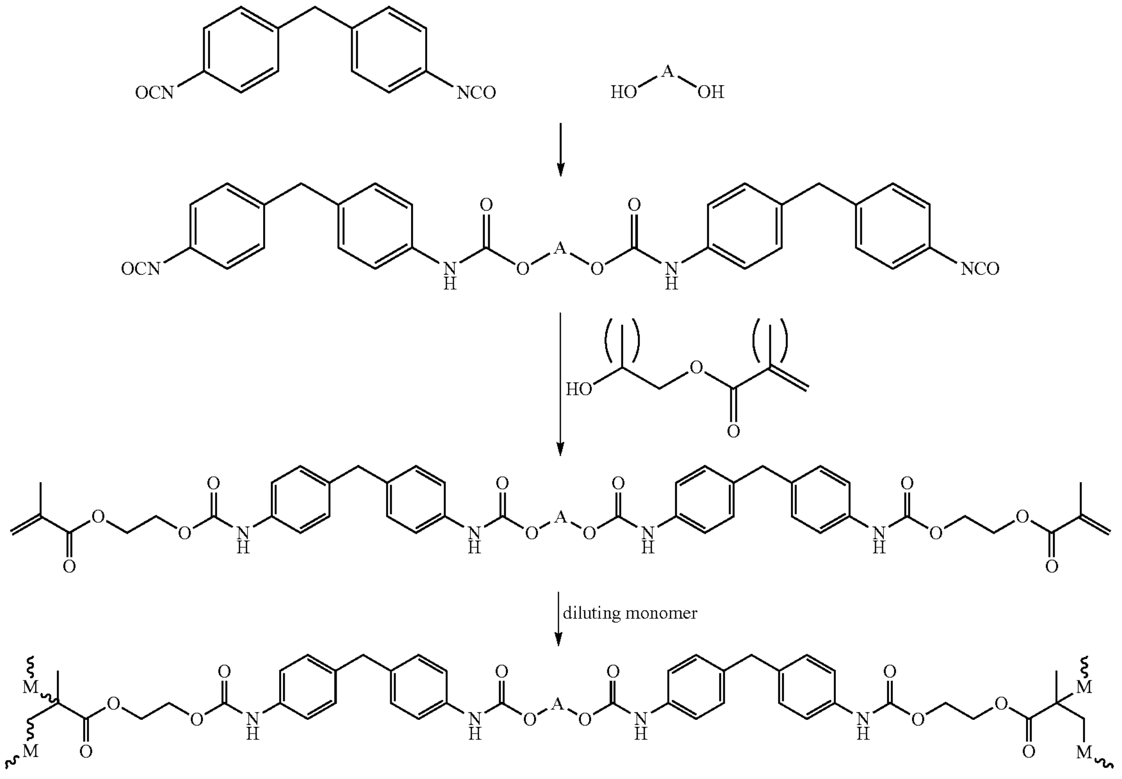

Furthermore, the degradation reaction equation of the polyurethane acrylic resin is shown in Table 2, wherein small molecule carbamate, small molecule ureido ester, polyol and polyacrylic acid molecule are formed by the alcoholysis and aminolysis of the polyurethane acrylic resin structure. Sustained the reaction, the final degradation products are speculated to be aromatic amine compound, oxazolidone, carbamate alcoholamine, and ureadiol.

TABLE 2

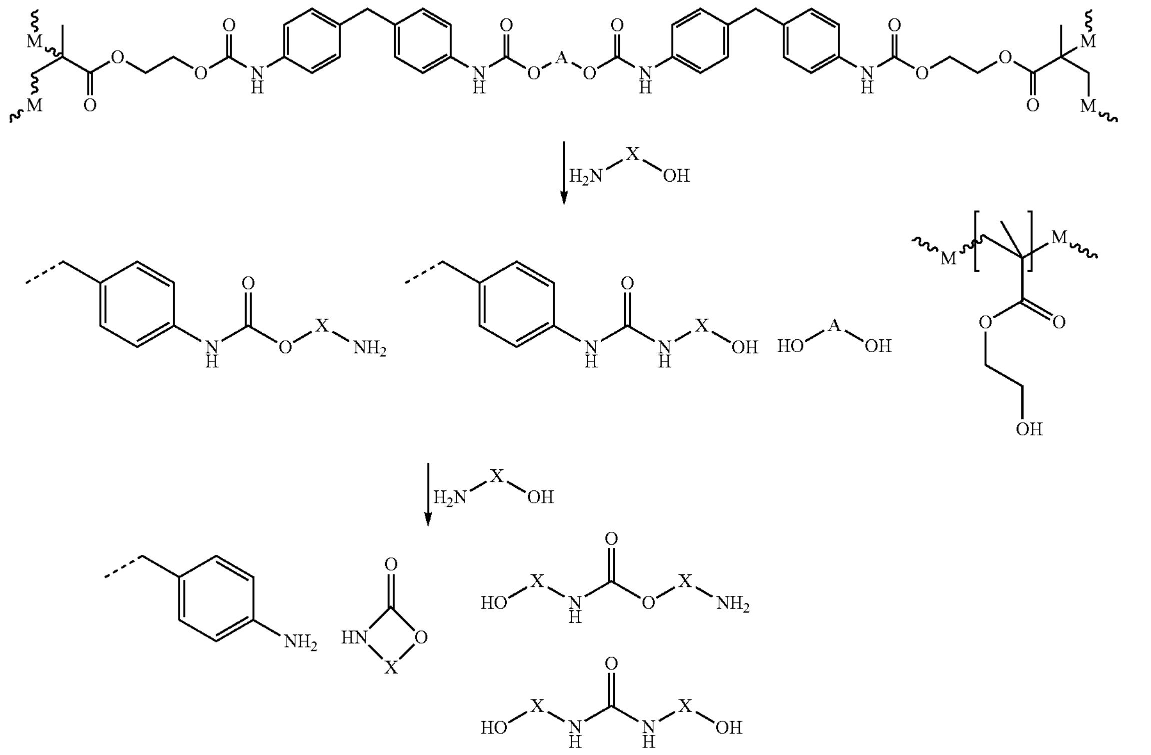

In other embodiments, more than 40% of the total weight of the polyurethane acrylic resin in the method for degrading the polyurethane acrylic resin material of the present disclosure is the oligomer prepared by the composition for preparing the polyurethane acrylic resin of the present disclosure, and the oligomer has the structure represented by formula (I) of the present disclosure, but it not limited thereto.

The application of the polyurethane acrylic resin material of the present disclosure can be surface coating, adhesive, 3D printing or main structure layer, and it can also add the filler such as titanium dioxide, silicon dioxide, calcium carbonate, aluminum oxide, aluminum hydroxide, silicon carbide or combination thereof according to the function. Therefore, it can be used in the manufacturing of automobile part, marine part, rail car part, sport product part, aviation part, wind turbine part, furniture part, and construction part.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

<Synthesis Example>

<Synthesis of Polyurethane Acrylic Resin>

Synthesis Example 1:280 g of polymethylene phenyl isocyanate, 0.318 g of 2,5-dihydroxytoluene and 0.159 g of catalyst (DBTDL) are dispersed in 228 g of methyl methacrylate, and mixed evenly in the reactor and heated to 45° C. to 60° C. for later use. Next, 138.9 g of polypropylene glycol (PPG400) is slowly dropped to the reactor, the dropping time is 40 to 60 minutes, the temperature is controlled below 60° C. during the dropping, and the dropping is completed at 45° C. to 60° C. and the temperature is maintained for 2 to 4 hours. Then, 180.8 g of hydroxyethyl methacrylate (2-HEMA) is dropped slowly, the dropping time is 40 to 60 minutes, the temperature is controlled below 60° C. during the dropping, and the dropping is completed at 45° C. to 60° C. and the temperature is maintained for 2 to 4 hours. When the NCO value is lower than 0.5%, 228 g of methyl methacrylate is added to dilute to obtain the polyurethane acrylic resin of Synthesis Example 1, and the viscosity thereof is 130 cps.

Synthesis Example 2: 250 g of polymethylene phenyl isocyanate, 0.317 g of 2,5-dihydroxytoluene and 0.159 g of catalyst (DBTDL) are dispersed in 227 g of methyl methacrylate, and mixed evenly in the reactor and heated to 45° C. to 60° C. for later use. Next, 186 g of polyethylene glycol (PEG600) is slowly added to the reactor, the dropping time is 40 to 60 minutes, the temperature is controlled below 60° C. during the dropping, and the dropping is completed at 45° C. to 60° C. and the temperature is maintained for 2 to 4 hours. Then, 161.4 g of hydroxyethyl methacrylate (2-HEMA) is dropped slowly, the dropping time is 40 to 60 minutes, the temperature is controlled below 60° C. during the dropping, and the dropping is completed at 45° C. to 60° C. and the temperature is maintained for 2 to 4 hours. When the NCO value is lower than 0.5%, 227 g of methyl methacrylate is added to dilute to obtain the polyurethane acrylic resin of Synthesis Example 2, and the viscosity thereof is 320 cps.

Synthesis Example 3: 330 g of polymethylene phenyl isocyanate, 0.308 g of 2,5-dihydroxytoluene and 0.179 g of catalyst (DBTDL) are dispersed in 169 g of methyl methacrylate, and mixed evenly in the reactor and heated to 45° C. to 60° C. for later use. Next, 61.4 g of polypropylene glycol (PPG400) is slowly dropped to the reactor, the dropping time is 40 to 60 minutes, the temperature is controlled below 60° C. during the dropping, and the dropping is completed at 45° C. to 60° C. and the temperature is maintained for 2 to 4 hours. Then, 293.6 g of hydroxyethyl methacrylate (2-HEMA) is dropped slowly, the dropping time is 40 to 60 minutes, the temperature is controlled below 60° C. during the dropping, and the dropping is completed at 45° C. to 60° C. and the temperature is maintained for 2 to 4 hours. When the NCO value is lower than 0.5%, 169 g of styrene is added to dilute to obtain the polyurethane acrylic resin of Synthesis Example 3, and the viscosity thereof is 300 cps.

Synthesis Example 4: 270 g of mixture of 2,4-diphenylmethane diisocyanate and 4,4'-diphenylmethane diisocyanate, 0.287 g of 2,5-dihydroxytoluene and 0.143 g of catalyst (DBTDL) are dispersed in 167 g of methyl methacrylate, and mixed evenly in the reactor and heated to 45° C. to 60° C. for later use. Next, 143.6 g of polypropylene glycol (PPG400) is slowly dropped to the reactor, the dropping time is 40 to 60 minutes, the temperature is controlled below 60° C. during the dropping, and the dropping is completed at 45° C. to 60° C. and the temperature is maintained for 2 to 4 hours. Then, 206.7 g of hydroxypropyl methacrylate (2-HPMA) is dropped slowly, the dropping time is 40 to 60 minutes, the temperature is controlled below 60° C. during the dropping, and the dropping is completed at 45° C. to 60° C. and the temperature is maintained for 2 to 4 hours. When the NCO value is lower than 0.5%, 207 g of methyl methacrylate is added to dilute to obtain the polyurethane acrylic resin of Synthesis Example 4, and the viscosity thereof is 150 cps.

Synthesis Example 5: 150 g of polymethylene phenyl isocyanate, 0.309 g of 2,5-dihydroxytoluene and 0.181 g of catalyst (DBTDL) are dispersed in 412 g of methyl methacrylate, and mixed evenly in the reactor and heated to 45° C. to 60° C. for later use. Next, 372.0 g of polypropylene glycol (PPG2000) is slowly dropped to the reactor, the dropping time is 40 to 60 minutes, the temperature is controlled below 60° C. during the dropping, and the dropping is completed at 45° C. to 60° C. and the temperature is maintained for 2 to 4 hours. Then, 96.8 g of hydroxyethyl methacrylate (2-HEMA) is dropped slowly, the dropping time is 40 to 60 minutes, the temperature is controlled below 60° C. during the dropping, and the dropping is completed at 45° C. to 60° C. and the temperature is maintained for 2 to 4 hours. When the NCO value is lower than 0.5%, the polyurethane acrylic resin of Synthesis Example 5 is obtained, and the viscosity thereof is 400 cps.

<Preparation of Polyurethane Acrylic Resin Material>

The polyurethane acrylic resin material can be the cured polyurethane acrylic resin and the composite material containing cured polyurethane acrylic resin. In detail, the polyurethane acrylic resin of Synthesis Example 1 to Synthesis Example 5 is cured with the cobalt isooctanoate (0.1% to 0.2%) and methyl ethyl ketone peroxide (1% to 2%) at the room temperature for 24 hours. Then, the cured polyurethane acrylic resin of Synthesis Example 6 to Synthesis Example 10 can be obtained respectively by baking at 105° C. for 2 hours. Furthermore, according to different process operation requirements, the curing system of the polyurethane acrylic resin can be adjusted to the appropriate gelation time for fiber impregnation molding at the room temperature, and then baked at 105° C. for 2 hours to obtain the cured composite material containing fiber.

EXAMPLE/COMPARATIVE EXAMPLE

Example 1: 5 g of the cured polyurethane acrylic resin of Synthesis Example 6 and 2-aminoethanol are added into the round-bottom flask equipped with graham condenser at the weight ratio of 1:5, and the temperature is 135° C. and maintained for 10 hours to obtain a clear solution, indicating that it can be degraded smoothly.

Example 2: 5 g of the cured polyurethane acrylic resin of Synthesis Example 6 and 2-aminoethoxyethanol are added into the round-bottom flask equipped with graham condenser at the weight ratio of 1:5, and the temperature is 135° C. and maintained for 24 hours to obtain a clear solution, indicating that it can be degraded smoothly.

Comparative Example 1: 5 g of the cured polyurethane acrylic resin of Synthesis Example 6 and ethylene glycol are added into the round-bottom flask equipped with graham condenser at the weight ratio of 1:5, and the temperature is 135° C. and maintained for 24 hours. A completely undissolved solidified product was shown in Comparative Example 1, indicating the poor degradation efficiency.

Comparative Example 2: 5 g of the cured polyurethane acrylic resin of Synthesis Example 6 and triethylenetetramine are added into the round-bottom flask equipped with graham condenser at the weight ratio of 1:5, and the temperature is 135° C. and maintained for 24 hours. A completely undissolved solidified product was shown in Comparative Example 2, indicating the poor degradation efficiency.

The resin type, the cured product type, the degradation solution type, the degradation time (hours) and the degradation state of Example 1, Example 2, Comparative Example 1 and Comparative Example 2 are shown in Table 3.

TABLE 3

| | | Example 1 | Example 2 | Comparative Example 1 | Comparative Example 2 |
|---|---|---|---|---|---|
| Resin type | | Synthesis Example 1 | Synthesis Example 1 | Synthesis Example 1 | Synthesis Example 1 |
| Cured product type | | Synthesis Example 6 | Synthesis Example 6 | Synthesis Example 6 | Synthesis Example 6 |
| Degradation Solution type | Ethylene glycol | X | X | ○ | X |
| | 2-Aminoethanol | ○ | X | X | X |

TABLE 3-continued

| | Example 1 | Example 2 | Comparative Example 1 | Comparative Example 2 |
|---|---|---|---|---|
| 2-Aminoethoxyethanol | X | ○ | X | X |
| Triethylenetetramine | X | X | X | ○ |
| Degradation time | 10 | 24 | >24 | >24 |
| Degradation state | Clear | Clear | Cured product | Cured product |

As shown in Table 3, it can be seen that the degradation solution containing the reactive $NH_2$ group and OH group selected in Example 1 and Example 2 can degrade the polyurethane acrylic resin to obtain the clear solution.

Example 3: 5 g of the cured polyurethane acrylic resin of Synthesis Example 7 and 2-aminoethanol are added into the round-bottom flask equipped with graham condenser at the weight ratio of 1:5, and the temperature is 135° C. and maintained for 10 hours to obtain a clear solution, indicating that it can be degraded smoothly.

Example 4: 5 g of the cured polyurethane acrylic resin of Synthesis Example 8 and 2-aminoethanol are added into the round-bottom flask equipped with graham condenser at the weight ratio of 1:5, and the temperature is 135° C. and maintained for 10 hours to obtain a clear solution, indicating that it can be degraded smoothly.

Example 5: 5 g of the cured polyurethane acrylic resin of Synthesis Example 9 and 2-aminoethanol are added into the round-bottom flask equipped with graham condenser at the weight ratio of 1:5, and the temperature is 135° C. and maintained for 10 hours to obtain a clear solution, indicating that it can be degraded smoothly.

Example 6: 5 g of the cured polyurethane acrylic resin of Synthesis Example 10 and 2-aminoethanol are added into the round-bottom flask equipped with graham condenser at the weight ratio of 1:5, and the temperature is 135° C. and maintained for 10 hours to obtain a powdery precipitate, indicating that it can be degraded smoothly.

The resin type, the cured product type, the degradation time (hours) and the degradation state of Example 3 to Example 6 are shown in Table 4.

TABLE 4

| | Example 3 | Example 4 | Example 5 | Example 6 |
|---|---|---|---|---|
| Resin type | Synthesis Example 2 | Synthesis Example 3 | Synthesis Example 4 | Synthesis Example 5 |
| Cured product type | Synthesis Example 7 | Synthesis Example 8 | Synthesis Example 9 | Synthesis Example 10 |
| Degradation time | 10 | 10 | 10 | 10 |
| Degradation state | Clear | Clear | Clear | Powdery precipitate |

Example 7: the glass fiber is vacuum infused by Synthesis Example 1, and the fiber content in weight is controlled to 68% to 75%. After complete curing, cutting it into appropriate size and added into the round-bottom flask equipped with graham condenser with 2-aminoethanol at the weight ratio of 1:5, and the temperature is 150° C. and maintained for 2 hours to obtain the solution in which the fiber and the polyurethane acrylic resin are separated. Then, the fiber is cleaned by ethanol/water, and the fiber can be recycled smoothly.

Example 8: the carbon fiber is vacuum infused by Synthesis Example 1, and the fiber content in weight is controlled to 50% to 55%. After complete curing, cutting it into appropriate size and added into the round-bottom flask equipped with graham condenser with 2-aminoethanol at the weight ratio of 1:5, and the temperature is 150° C. and maintained for 2 hours to obtain the solution in which the fiber and the polyurethane acrylic resin are separated. Then, the fiber is cleaned by ethanol/water, and the fiber can be recycled smoothly.

Example 9: the aromatic polyamide fiber is vacuum infused by Synthesis Example 1, and the fiber content in weight is controlled to 50% to 55%. After complete curing, cutting it into appropriate size and added into the round-bottom flask equipped with graham condenser with 2-aminoethanol at the weight ratio of 1:5, and the temperature is 150° C. and maintained for 2 hours to obtain the solution in which the fiber and the polyurethane acrylic resin are separated. Then, the fiber is cleaned by ethanol/water, and the fiber can be recycled smoothly.

Example 10: the glass fiber is hand laid-up by Synthesis Example 3, and the fiber content in weight is controlled to 30% to 50%. After complete curing, cutting it into appropriate size and added into the round-bottom flask equipped with graham condenser with 2-aminoethanol at the weight ratio of 1:5, and the temperature is 150° C. and maintained for 2.5 hours to obtain the solution in which the fiber and the polyurethane acrylic resin are separated. Then, the fiber is cleaned by ethanol/water, and the fiber can be recycled smoothly.

The resin type, the fiber type, the degradation time (hours) and the degradation state of Example 7 to Example 10 are shown in Table 5.

TABLE 5

| | Example 7 | Example 8 | Example 9 | Example 10 |
|---|---|---|---|---|
| Resin type | Synthesis Example 1 | Synthesis Example 1 | Synthesis Example 1 | Synthesis Example 3 |
| Fiber type | Glass fiber | Carbon fiber | Aromatic polyamide fiber | Glass fiber |
| Degradation time | 2 | 2 | 2 | 2.5 |
| Degradation state | Resin and fiber separation | Resin and fiber separation | Resin and fiber separation | Resin and fiber separation |

As shown in Table 5, it can be seen that after the composite material containing the polyurethane acrylic resin and the fiber is degraded by the degradation solution containing the reactive $NH_2$ group and OH group, the polyurethane acrylic resin can be decomposed and removed to separate the resin from the fiber and the fiber which is remained without the plastic adhesion, and the purpose of fiber recycling and reusing can be achieved.

In conclusion, the polyurethane acrylic resin material of the present disclosure is degraded by heating the degradation solution containing the reactive NH or $NH_2$ group and OH group, which can achieve the high-efficiency depolymerization effect, and the degradation solution after the degradation can be recycled and reused to achieve the purpose of waste reduction.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for degrading a polyurethane acrylic resin material, comprising:

providing the polyurethane acrylic resin material, wherein the polyurethane acrylic resin material is obtained by curing a polyurethane acrylic resin;

providing a degradation solution, wherein the degradation solution comprises a degradation reagent, and the degradation reagent comprises an NH or $NH_2$ group and an OH group;

performing a mixing step, wherein the polyurethane acrylic resin material is mixed with the degradation solution to form a degradation mixture; and performing a heating step, wherein the degradation mixture is heated to a degradation temperature and maintained a degradation time to degrade the polyurethane acrylic resin material.

2. The method for degrading the polyurethane acrylic resin material of claim 1, wherein the polyurethane acrylic resin material is a cured polyurethane acrylic resin or a composite material containing cured polyurethane acrylic resin.

3. The method for degrading the polyurethane acrylic resin material of claim 2, wherein the composite material containing cured polyurethane acrylic resin comprises the polyurethane acrylic resin and a fiber.

4. The method for degrading the polyurethane acrylic resin material of claim 3, wherein the fiber is a glass fiber, a carbon fiber, a polyamide fiber, or a mixture thereof.

5. The method for degrading the polyurethane acrylic resin material of claim 1, wherein the degradation reagent has a structure represented by formula (i):

$$NH_m(X—OH)_n \quad \text{formula (i);}$$

wherein X is an alkyl group or an oxyalkyl group, m is 1 or 2 and m+n=3.

6. The method for degrading the polyurethane acrylic resin material of claim 1, wherein the degradation temperature is from 135° C. to a boiling point temperature of the degradation solution.

7. The method for degrading the polyurethane acrylic resin material of claim 1, wherein the degradation time is 2 hours to 24 hours.

8. The method for degrading the polyurethane acrylic resin material of claim 1, wherein a preparation of the polyurethane acrylic resin comprises following steps:

performing a polyurethane polymerization step, wherein an isocyanate compound, an inhibitor and a catalyst are mixed in a diluting monomer, and heated to a first temperature to obtain a first mixture, then a polyol compound is added to the first mixture and maintained at the first temperature to react to obtain a second mixture; and performing a polyurethane acrylic esterification step, wherein a hydroxyl-containing (methyl)acrylate compound is added to the second mixture and maintained at the first temperature to react to obtain the polyurethane acrylic resin.

9. The method for degrading the polyurethane acrylic resin material of claim 8, wherein the preparation of the polyurethane acrylic resin further comprises:

performing a diluting step, wherein after the second mixture added with the hydroxyl-containing (methyl) acrylate compound reacting at the first temperature, the second mixture is cooled and the diluting monomer is added to obtain the polyurethane acrylic resin.

10. The method for degrading the polyurethane acrylic resin material of claim 8, wherein the isocyanate compound is a bifunctional isocyanate compound or a polyfunctional isocyanate compound.

11. The method for degrading the polyurethane acrylic resin material of claim 10, wherein the bifunctional isocyanate compound or the polyfunctional isocyanate compound is an aromatic ring isocyanate.

12. The method for degrading the polyurethane acrylic resin material of claim 8, wherein the polyol compound is a bifunctional polyol compound or a polyfunctional polyol compound, and a number average molecular weight of the polyol compound is less than 2000.

13. The method for degrading the polyurethane acrylic resin material of claim 12, wherein the polyol compound is a polyoxyethylene ether, a polyoxypropylene ether, a polytetrahydrofuran or a mixture thereof.

14. The method for degrading the polyurethane acrylic resin material of claim 8, wherein the polyurethane acrylic resin has an oligomer represented by formula (I):

formula (I)

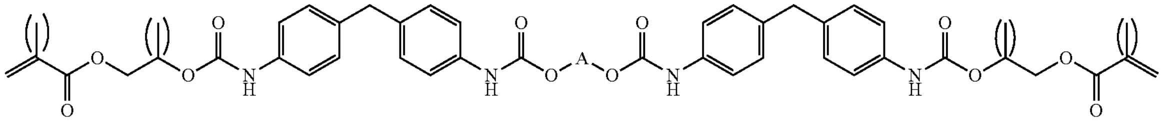

;

wherein A is a polyethoxy group, a polypropoxy group or a polytetrahydrofuran group.

15. The method for degrading the polyurethane acrylic resin material of claim 8, wherein an equivalent ratio of a NCO group of the isocyanate compound to an OH group of the polyol compound is 1.5:1 to 10:1.

16. The method for degrading the polyurethane acrylic resin material of claim 8, wherein the hydroxyl-containing (methyl)acrylate compound is a hydroxyethyl methacrylate, a hydroxyethyl acrylate, a hydroxypropyl methacrylate, a hydroxypropyl acrylate or a mixture thereof.

17. The method for degrading the polyurethane acrylic resin material of claim 8, wherein the diluting monomer is a free radical curable diluting monomer, and is a (methyl) methacrylate, a (methyl)ethyl acrylate, a (methyl)hydroxyethyl acrylate, a (methyl)hydroxypropyl acrylate, a (methyl) isobornyl acrylate, a (methyl)cyclohexyl acrylate, a (methyl) tetrahydrofurfuryl acrylate, a styrene, a methyl styrene, a vinyl toluene or a mixture thereof.

18. The method for degrading the polyurethane acrylic resin material of claim 8, wherein the first temperature is 40° C. to 80° C.

19. The method for degrading the polyurethane acrylic resin material of claim 8, wherein the catalyst is an organic tin, an organic bismuth or an organic zinc, and an added amount of the catalyst is 50 ppm to 200 ppm of a total content of the polyurethane acrylic resin.

20. The method for degrading the polyurethane acrylic resin material of claim 8, wherein an equivalent ratio of an OH group of the hydroxyl-containing (methyl)acrylate compound to a NCO group of the isocyanate compound remaining after the polyurethane polymerization step is 1:1 to 1.05:1.

* * * * *